Nov. 23, 1943. W. SIEGERIST 2,334,887
ARTICLE HANDLING MECHANISM
Filed Aug. 13, 1942 4 Sheets-Sheet 3
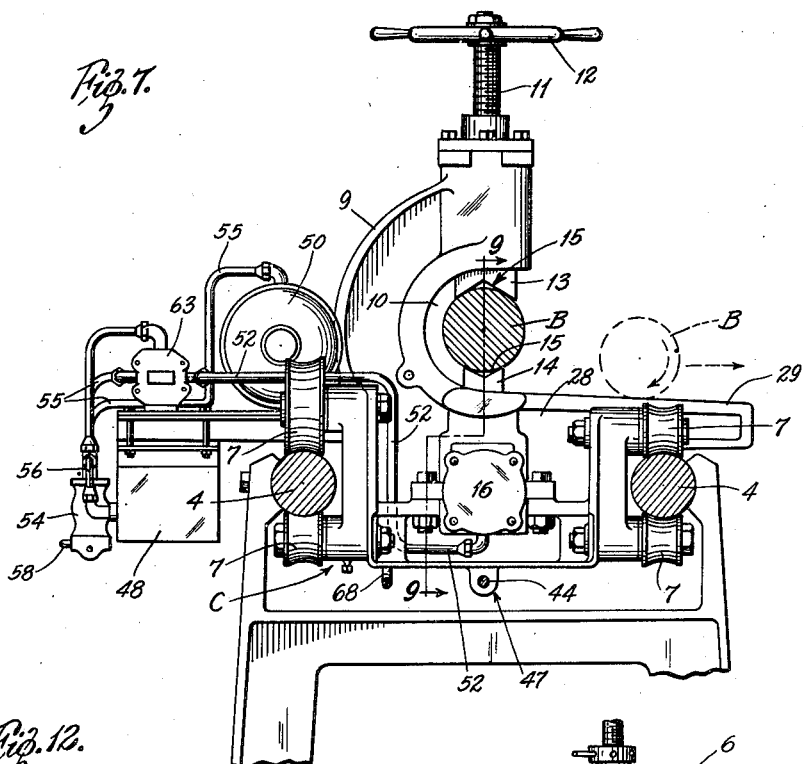
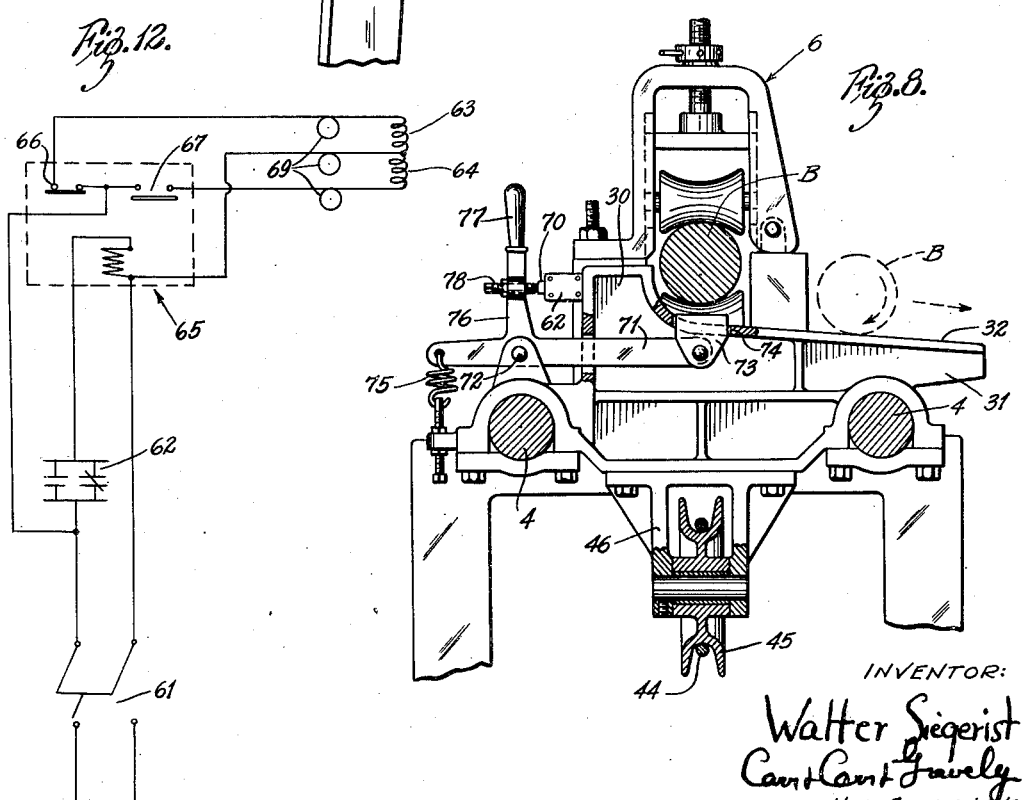
INVENTOR:
Walter Siegerist
HIS ATTORNEYS.

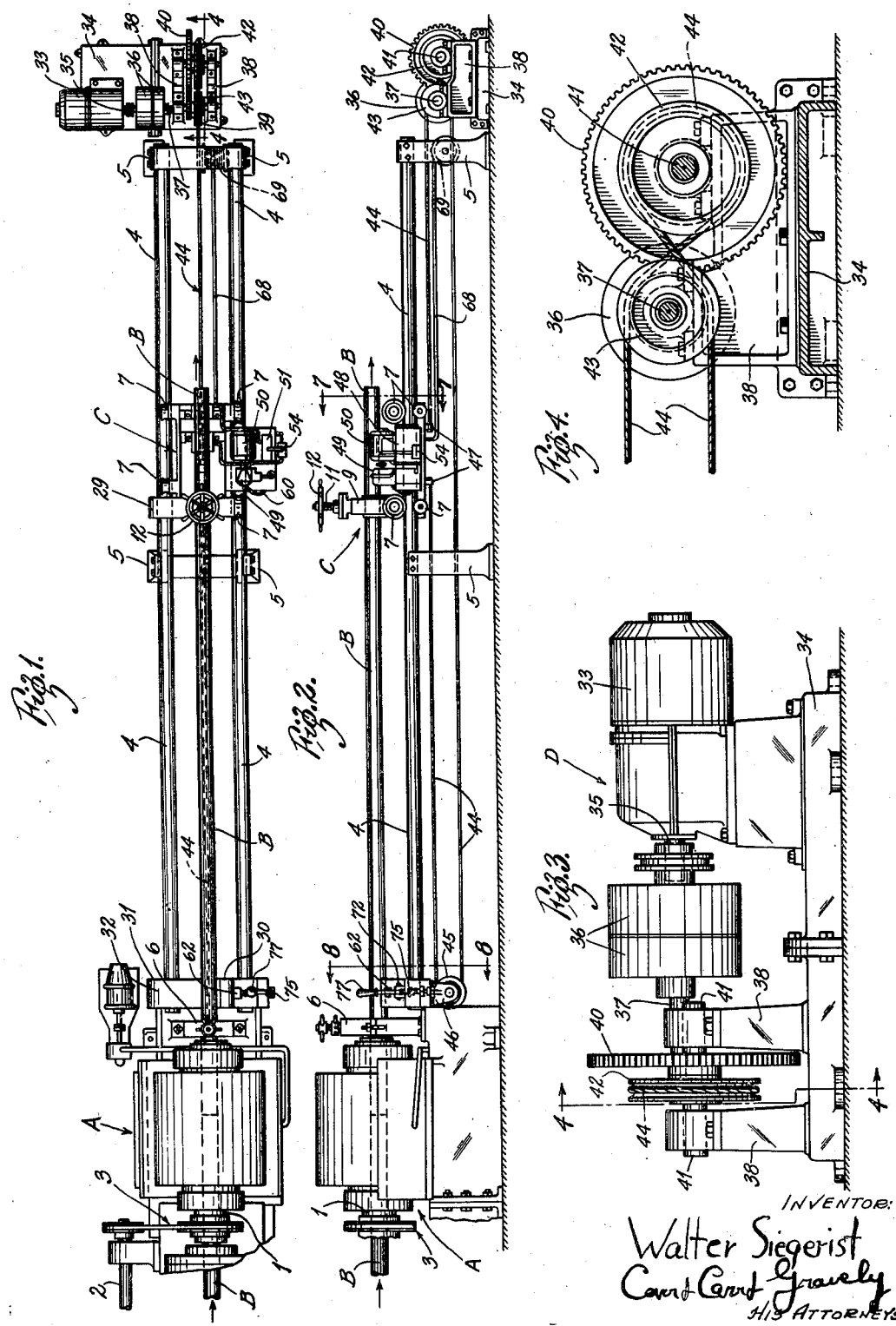

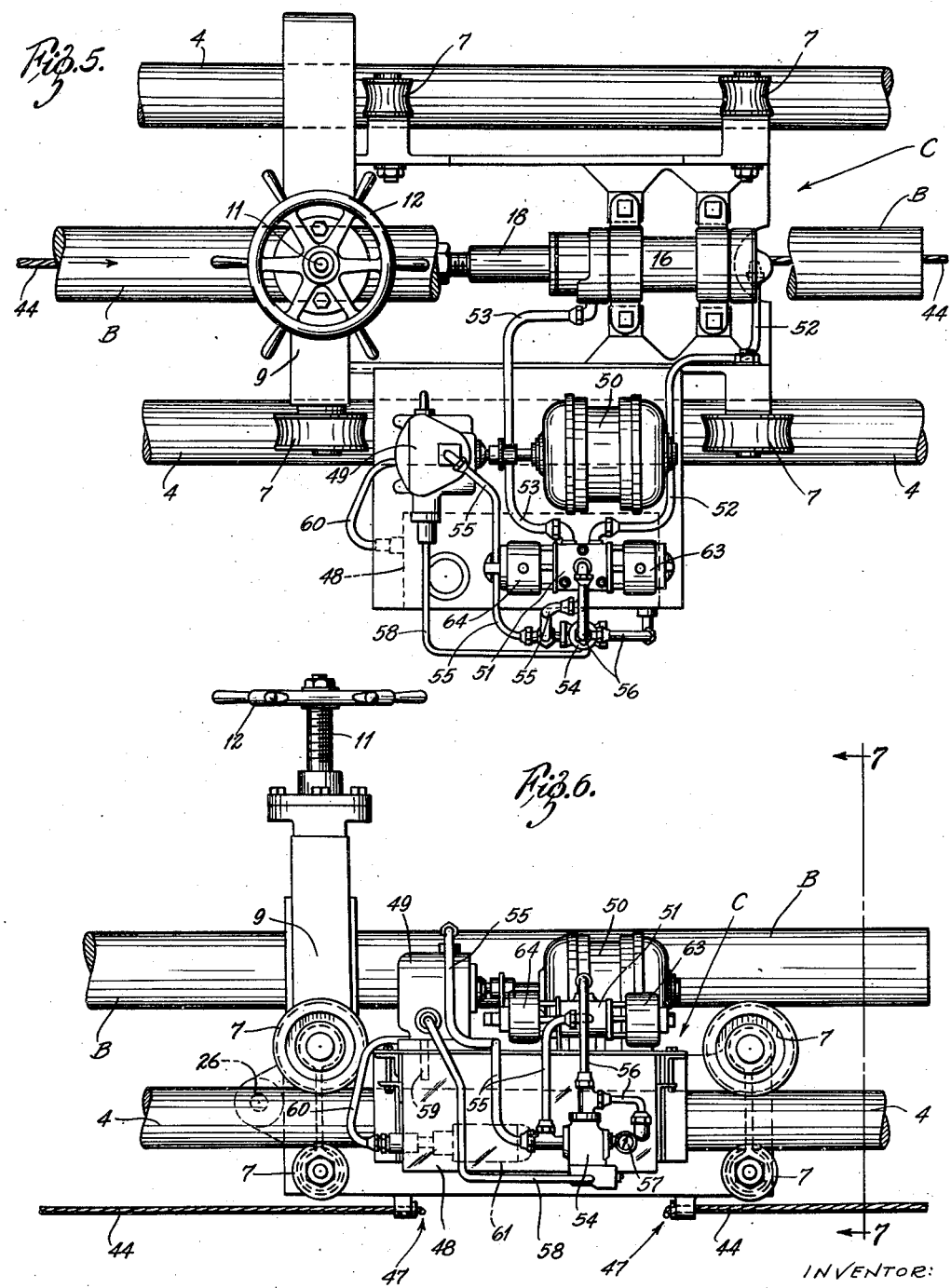

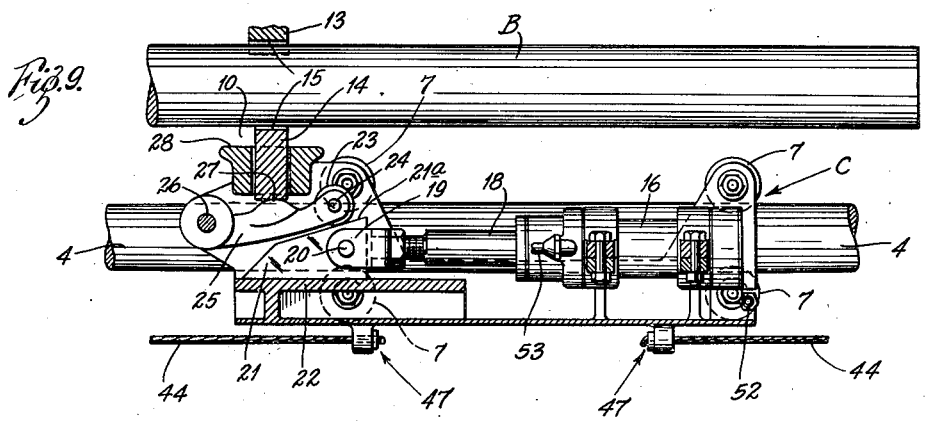
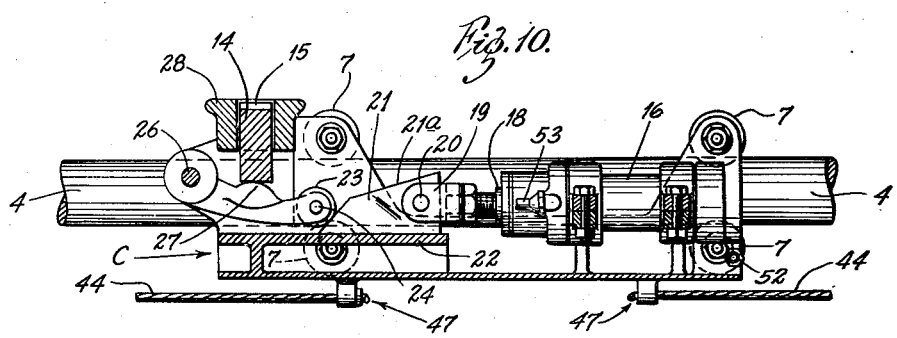
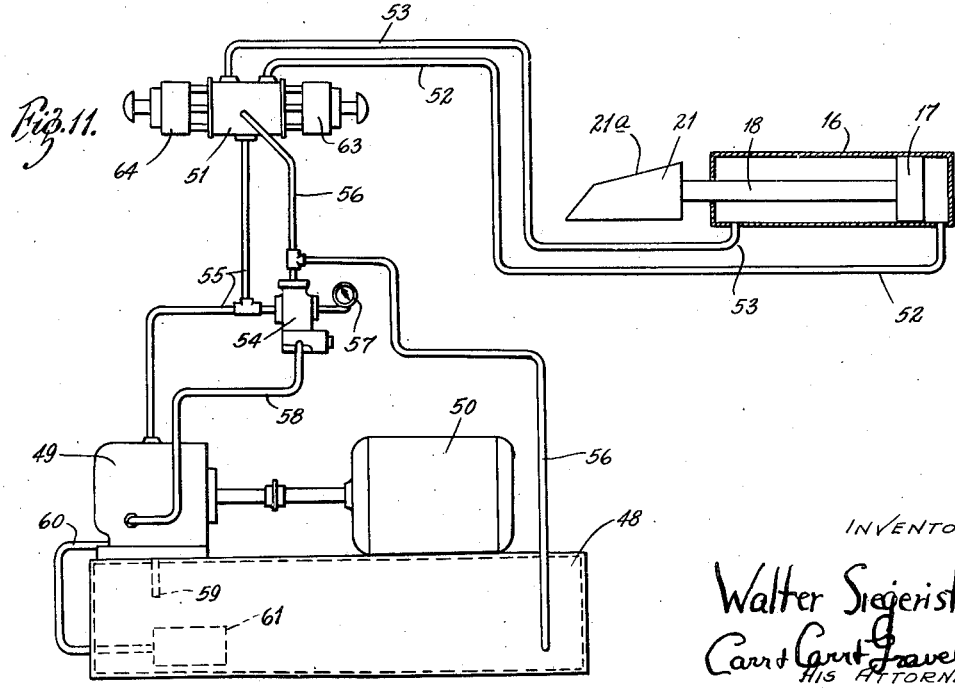

Patented Nov. 23, 1943

2,334,887

UNITED STATES PATENT OFFICE 2,334,887

ARTICLE HANDLING MECHANISM

Walter Siegerist, University City, Mo.

Application August 13, 1942, Serial No. 454,662

13 Claims. (Cl. 214—1)

This invention relates generally to machines for turning and finishing long bar stock of circular section, and more particularly to the carriage mechanism for supporting and holding the axially moving stock against rotation on the output or discharge side of the rotary cutterhead of the machine and for releasing and discharging the finished stock from said carriage after it leaves said cutterhead. The invention has for its principal object a discharge carriage, whose stock gripping device is controlled by a fluid pressure circuit that is supported entirely on said carriage so as to constitute therewith a self-contained unit. Another object is to provide an electric control circuit for the fluid pressure circuit carried by said carriage. Another object is to provide for the automatic operation of said electric circuit by the finished bar stock as it leaves the cutterhead to automatically open the stock gripping device of the discharge carriage. Another object is to provide for returning the carriage to starting position after the discharge of the bar stock. Another object is to provide manual control means for the electric control circuit. The invention consists in the parts and in the arrangements and combinations of parts hereinafter described and claimed.

In the accompanying drawings, which form part of this specification and wherein like symbols refer to like parts wherever they occur, Fig. 1 is a plan view of a portion of a bar turning machine embodying my invention, Fig. 2 is a side elevational view of the portion of the machine shown in Fig. 1, Fig. 3 is a rear elevational view of the drive unit for the cable for returning the discharge grip carriage to starting position, Fig. 4 is a vertical sectional view on the line 4—4 in Fig. 3, Fig. 5 is an enlarged top plan view of the discharge grip carriage and the adjacent supporting rails therefor, Fig. 6 is a side elevational view of the parts shown in Fig. 5, Fig. 7 is a vertical cross-section on the line 7—7 in Fig. 6, Fig. 8 is an enlarged vertical cross-section on the line 8—8 in Fig. 2, Fig. 9 is a fragmentary vertical longitudinal section on the line 9—9 in Fig. 7, Fig. 10 is a section similar to Fig. 9, showing the work gripping device in released position, Fig. 11 is a diagrammatic view, showing the hydraulic circuit for operating the work gripping device; and Fig. 12 is a diagrammatic view, showing the electric control circuit for the hydraulic circuit shown in Fig. 11.

In the accompanying drawings my invention is shown in connection with a machine for turning or finishing relatively long bar stock of circular section. The cutting unit of such a machine comprises a housing A having an opening (not shown) that extends horizontally therethrough and contains one or more rotary cutterheads (not shown), through which the bar stock B is fed axially. The cutterhead housing A also contains a suitable mechanism (not shown) for driving the rotary cutterheads therein, said mechanism including shaft 1 journaled in said housing, a drive shaft 2, and a belt-and-pulley connection 3 between said shafts.

The above machine also includes spaced, parallel, horizontally disposed rails or runner bars 4 that project from the housing A on the output or discharge side thereof and are supported on pedestals 5. Said machine also includes a suitable steady rest 6 that is mounted on the output side of the cutterhead housing A, and serves to guide and support the bar stock B as it emerges from said housing.

Supported on the rails 4 for movement longitudinally thereof is a discharge grip carriage C having a pair of vertically spaced rollers 7 that are journaled horizontally thereon adjacent to each corner thereof one above and the other below a supporting rail and are longitudinally concave to fit to the cylindrical surface thereof. The carriage C is provided at one end with a bar stock gripping or clamping device comprising an upstanding substantially C-shaped bracket 9, through which the bar stock A extends. Mounted in the upper portion of the bracket 9 above the lateral recesses or notch 10 therein is a vertical screw 11 having an operating wheel 12 fixed to the upper end thereof and a clamp block 13 fixed to the lower end thereof. The clamp block 13 constitutes one element of the bar stock gripping device, the other element of said device comprising a vertically movable clamp block 14 mounted in the C-shaped bracket 9 at the bottom of the bar receiving opening 10 therein in vertical alinement with the clamp block 13. The clamp blocks 13 and 14 engage the upper and lower surfaces respectively of the bar stock B and their opposing stock engaging ends are grooved, as at 15, to prevent the stock from turning.

The upper clamp block 13 is adjusted for bar stock of different diameters by means of the handwheel 12; and the lower clamp block 14 is moved towards and away from the upper clamp block by means of a double hydraulic cylinder 16 rigidly mounted on the carriage C for movement therewith. The cylinder 16 has a piston 17 working therein which is provided with a piston rod 18 having a yoke 19 threaded on the outer or working end thereof. The yoke 19 is connected by means of a horizontal pivot 20 to a wedge block 21 that is supported for horizontal sliding movement in a suitable slideway 22 provided therefor in the carriage C. The inclined upper surface 21a of the wedge block 21 engages and supports a roller 23 journaled on a horizontal pin 24 in the free end of a rocker arm 25 that is pivotally supported in the carriage C on a pin 26 for vertical swinging movement relative to said wedge block. The rocker arm 25 extends beneath the lowermost clamp block 14 of the bar gripping device of the carriage C and has a convex cam surface 27 on its upper edge that is disposed beneath said clamp block and constitutes a support therefor. By this arrangement, when the wedge block 21 is moved in the direction of the bar gripping device, the rocker arm 25 and the lowermost clamping block 14 seated thereon are moved upwardly, thus forcing said clamping block into engagement with the bar stock B; and when said wedge block is moved in the opposite direction by the hydraulic cylinder, said arm and clamp block move downwardly and thus release said bar stock.

The base portion 28 of the upstanding C-shaped bracket 9 of the bar gripping device extends laterally of the carriage C from the bottom of the lateral opening 10 in said bracket to a point beyond one side of said carriage; and the upper surface 29 of said base portion 28 of said bracket is inclined downwardly and outwardly from the bottom of the bar stop receiving opening 10 thereof to the overhanging outer end of said base portion, whereby the leading end of said bar stock is deposited on said surface and rolls down the same and off the end thereof when the lower clamp jaw 14 is retracted.

Rigidly mounted on the run-out rails 4 adjacent to the discharge side of the steady rest 6 is a bar discharge or roll-off crosshead 30 having a portion 31 which extends beyond the discharge side of the discharge grip carriage C and has an outwardly and downwardly inclined surface 32 similar to and at the level of the inclined bar roll-off surface 29 of said carriage, whereby the trailing end of said bar stock, after leaving the steady rest 6, drops upon the inclined surface 32 and rolls therealong and off the free end thereof.

In practice, the carriage C is moved along the run-out rails 4 to a point adjacent to the output end of the cutterhead housing A, and the leading end of the bar stock B is clamped to the carriage by the gripping device thereon when said end has advanced far enough to enter the C-shaped bracket 9 on said carriage. When the bar stock B is clamped to the carriage C, the latter is moved along its supporting rails 4 away from the cutterhead housing A by the movement of said bar stock as it is fed through said cutterhead housing by a suitable work feeding mechanism (not shown) on the input side thereof. After the bar stock is released by the gripping mechanism of the carriage and is discharged therefrom by rolling off one side thereof, the carriage is returned to a position adjacent to the cutter head housing A by means of a quick return mechanism or unit D located adjacent to the outermost slide rail supporting pedestal 5. This carriage return mechanism comprises an electric motor 33 mounted on a base 34 with its armature shaft 35 disposed transversely of the run-out rails 4 and operatively connected by a suitable magnetic clutch 36 or directly connected without a clutch, to a horizontal shaft 37 which is journaled in spaced pedestals 38 and has a spur pinion 39 fixed thereto between said pedestals. This pinion intermeshes with a spur gear 40 fixed to a horizontal shaft 41 between the pedestals 38, which rotatably support opposite ends of said shaft. A relatively large pulley or sheave 42 is fixed to the shaft 41 between the pedestals 38; and a relatively small, double groove idler pulley or sheave 43 is journaled on the pinion gear shaft 37 between said pedestals. A wire rope or cable 44 is wrapped around the small double groove idler pulley or sheave 43 and extends around the larger single groove drive pulley 42. The cable 44 extends beneath and longitudinally of the side rails to the fixed bar discharge or roll-off crosshead 30 where it passes around an idler pulley or sheave 45 journaled on a bracket 46 depending from the lower side of said crosshead. The upper run or strand of the cable 44 is suitably secured, as at 47, to the underside of the carriage C, whereby said cable acts as an endless belt for moving said carriage in the direction of the cutterhead housing A.

The hydraulic circuit for controlling the bar gripping device carried by the carriage C is shown diagrammatically in Fig. 11. This circuit includes the bar grip operating cylinder 16, a tank 48 for oil or other fluid, and a suitable pump 49 operated by an electric motor 50, said cylinder, tank, pump and motor being all mounted on and movable with the carriage C. Said hydraulic circuit also includes a four-way control valve 51, conduits 52 and 53 leading from said valve to the head and rod ends, respectively, of the cylinder 16, a pressure relief valve 54, a conduit 55 leading from the discharge side of the pump 49 to said four-way valve and to said pressure relief valve, a return conduit 56 leading from said four-way valve to said relief valve and to the tank 48, a pressure gauge 57 connected to said relief valve, a conduit 58 connecting the vents of said pressure relief valve and pump, a drain conduit 59 leading from said pump to said tank, and an intake conduit 60 leading from a suitable filter 61 located in said tank, all of said valves, gauges and conduits, like the tank, cylinder, pump and motor, being mounted on and movable with the carriage C. Thus, the entire hydraulic circuit for operating the gripping device of the carriage C is mounted entirely thereon and constitutes therewith a self-contained unit.

The hydraulic circuit is controlled by the electric circuit illustrated diagrammatically in Fig. 12 of the drawings. Said electric circuit includes a main cut-off switch 61, a bar-trip limit switch 62, a solenoid 63 for shifting the four-way valve 51 to a position that will direct the clamping pressure through the conduit 52 to the head end of the cylinder 16, a solenoid 64 for shifting said four-way valve to a position that will direct the unclamping pressure through the conduit 53 to the rod end of said cylinder, and a suitable control relay 65 for said solenoids having one pole or switch 66 for opening and closing the circuit of the solenoid 63 and another pole or switch 67 for opening and closing the circuit of the solenoid 64. The electromagnet device or relay 65 is of the type wherein the opening or closing of one of the pole switches 66, 67 thereof produces a corresponding opening or closing of the other. The two solenoids 63, 64 for operating the four-way valve 51, together with the control relay 65 therefor and motor 50, are located on the carriage C for movement therewith, while the limit switch 62 for said solenoids 63, 64 is mounted on the cutterhead housing A; and current is supplied to said switch and motor through a cable 68 which contains the leads therefor and which automatically winds and unwinds in response to the movement of said carriage on a suitable reel 69 journaled on the outermost run-out rail supporting pedestal or stand 5.

The bar trip limit switch 62 for controlling the relay 65 is mounted on the fixed bar discharge or roll-off crosshead member 30, said limit switch having a sliding contact actuating plunger 70 adapted, when pushed inwardly, to energize one solenoid and deenergize the other, and when again pushed in the same direction to deenergize the energized solenoid and energize the deenergized solenoid. This mechanism for actuating the limit switch 62 comprises a lever 71 pivotally supported, as at 72, for vertically swinging movement on the roll-off crosshead 30. The inner arm of the lever 71 terminates beneath the bar stock B and has a shoe 73 pivotally secured thereto and arranged for vertical sliding movement in a slot 74 provided therefor in the inclined bar roll-off surface 32 of said crosshead. A coil tension spring 75 has one end anchored to the cross head 30 and the other end anchored to the opposite or outer arm of the lever 71, thereby holding the inner mentioned arm in raised position with the shoe carried thereby just below but clear of the bar stock B. The lever has a third, upstanding arm 76 terminating at its free upper end in a handle portion 77; and this arm carries an axially adjustable pin 78 disposed in endwise abutment with and normally clear of the exposed outer end of the plunger 70 for operating the limit switch 62. Thus the bar gripping device carried by the carriage may be opened and closed by manually operating the lever 71, and said gripping device, after being closed upon the bar stock, is automatically opened when the trailing end of said bar stock drops from the steady rest and strikes the shoe 73 on the arm 71 of said lever, thus causing pin 78 thereof to actuate said switch and reverse the relay 65 and the solenoids controlled thereby. This reverse of the two solenoid circuits brings about a reversal of the four-way valve 51, thus supplying pressure to the rod end of the cylinder 16 and retracting the clamp operating wedge 21, whereby the lower jaw 14 of the gripping device moves downwardly and the leading end of the bar stock drops onto the inclined surface 29 of the C-shaped clamp bracket 9 and rolls off the end thereof.

The above machine operates as follows: The drive unit D is operated to move the carriage C along the run-out rails 4 to a point adjacent to the crosshead 30 on the output side of the cutterhead housing A. When the leading end of the bar stock B emerges from the steady rest 6 and passes through the open bar gripping device of the carriage, the lever 71 mounted on the stationary crosshead 30 is manually operated by means of the handle 77 to actuate the limit switch 62 and thus close said gripping device on the bar. The carriage is then moved along the run-out rails 4 by the axially moving bar stock. When the trailing end of the axially moving bar emerges from the steady rest 6 on the output side of the cutterhead housing A, said end of said bar stock drops upon the shoe 73 carried by the lever 71 on the crosshead 30, thus causing said lever to actuate the limit switch 62, which reverses the solenoids 63 and 64 and the valve 51 controlled thereby, whereby the hydraulic cylinder 16 is operated in a direction that will permit the lowermost jaw 14 of the gripping device to move downwardly and thus release the leading end of the bar stock from said gripping device. The released bar stock then rolls down the inclined surfaces 29 and 32 of the bar grip supporting bracket 9 and bar roll-off crosshead 30, respectively, and drops off at the ends of said surfaces at one side of the machine.

The hydraulic pump 49 is of the variable delivery, self-regulating type so that, when the bar grip operating piston 17 is not in movement, the pump automatically discharges a minimum amount of fluid. The pump 49 and motor 50 are in continuous operation, whereby the hydraulic pressure is available at all times; and the relief valve 54 enables excess fluid to be returned to the fluid supply tank or reservoir 48 carried by the carriage. The entire hydraulic circuit for operating the bar grip device carried by the carriage is mounted entirely upon said carriage and thus constitutes a self-contained unit therewith. The solenoids for operating the hydraulic valve 51, together with the control relay 65 for said solenoids and the electric motor 50 for driving said pump, are also mounted on the carriage, while the limit switch 62 for controlling said relay is mounted on the stationary crosshead member in position for manual or automatic operation. The source of current for the electric control circuit for the hydraulic circuit is the cable 68 containing the wires leading to the motor, solenoids and relay on the carriage, which cable winds and unwinds from the reel 69 located at the outer end of the run-out rails. The carriage C is returned to starting position by the quick return unit D, which includes the cable 44 and the motor 33, the control circuit (not shown) for said motor including a suitable push button control accessible to the operator.

Obviously, the hereinbefore described machine admits of considerable modification without departing from the invention. Therefore, I do not wish to be limited to the precise arrangements shown and described.

What I claim is:

1. A supporting mechanism for a moving work piece, said mechanism comprising a freely movable carriage, work gripping means on said carriage for clamping said carriage to said work for movement therewith, a fluid pressure system for actuating said work gripping means, said system being supported entirely on for movement with said carriage and constituting therewith a self-contained unit, said system including a valve for controlling the opening and closing of said gripping means, and an electric control circuit for said valve including a switch mounted on a stationary part of said mechanism, and means operable by the work to actuate said switch to open said gripping means.

2. A supporting mechanism for a moving work piece, said mechanism comprising a freely movable work supporting carriage, and a fluid pressure system including a fluid pressure actuated work gripping means for clamping said carriage to said work for movement therewith, said system being supported entirely on, for movement with said carriage and constituting therewith a self-contained unit, an electric circuit associated with said fluid pressure system and including a manually operable switch for controlling the opening and closing of said gripping means, means operable by the work for actuating said switch to open said gripping means and an electric driving unit operable upon the opening of said gripping means for imparting a return movement to said carriage.

3. A supporting mechanism for a moving work piece, said mechanism comprising a stationary work support, a carriage located on the discharge side of said stationary work support, means on said carriage for clamping the leading end of the work thereto as it leaves said stationary work support, a fluid pressure system for actuating said work clamping means, said system being supported entirely on said carriage to thereby constitute therewith a self-contained unit, and control means for said fluid pressure system operable by the trailing end of said work piece as it leaves said stationary work support to disengage said clamping device from the leading end of said work piece.

4. A supporting mechanism for a moving work piece, said mechanism comprising a stationary work support, a carriage located on the discharge side of said stationary work support, means on said carriage for gripping the leading end of the work as it leaves said stationary work support, a fluid pressure system for actuating said work gripping means, said system being supported entirely on said carriage to thereby constitute a self-contained unit therewith, and an electric control circuit for said fluid pressure system operable by the trailing end of said work piece as it leaves said stationary work support to open said work gripping device.

5. A supporting mechanism for a moving work piece, said mechanism comprising a stationary work support, a carriage located on the work delivery side of said stationary work support, means on said carriage for gripping the leading end of the work piece as it leaves said stationary work support, whereby said carriage moves with said work piece away from said stationary work support, a fluid pressure system for actuating said work gripping means, said system being supported entirely on said carriage so as to constitute therewith a self-contained unit, an electric control circuit for said fluid pressure system including a manually operable switch for controlling the opening and closing of said work gripping means, and means operated by the trailing end of the work as it leaves said stationary work support for actuating said switch to open said work gripping device.

6. A supporting mechanism for a moving work piece, said mechanism comprising a stationary work support, a carriage mounted on the discharge side of said stationary work support, means on said carriage for gripping the leading end of said work piece as it leaves said stationary work support, a fluid pressure system for actuating said work gripping means, said system being supported entirely on for movement with said carriage and constituting therewith a self-contained unit, said system including a valve for controlling the opening and closing of said work gripping means, and means operable by the trailing end of said work piece as it leaves said stationary work support to actuate said valve to open said work gripping means.

7. A supporting mechanism for a moving work piece, said mechanism comprising a stationary work support, a carriage mounted on the discharge side of said stationary work support, means on said carriage for gripping the leading end of said work piece as it leaves said stationary work support, a fluid pressure system for actuating said work gripping means, said system being supported entirely on for movement with said carriage and constituting therewith a self-contained unit, said system including a valve for controlling the opening and closing of said work gripping means, and means operable by the trailing end of said work piece as it leaves said stationary work support to actuate said valve to open said work gripping means, and separate means operable upon the release of said work gripping means for returning said carriage to a position adjacent to the work discharge side of said stationary work support.

8. A supporting mechanism for a moving work piece, said mechanism comprising a stationary work support, a carriage mounted on the discharge side of said stationary work support, means on said carriage for gripping the leading end of said work piece as it leaves said stationary work support, a fluid pressure system for actuating said work gripping means, said system being supported entirely on for movement with said carriage and constituting therewith a self-contained unit, said system including a valve for controlling the opening and closing of said work gripping means, and means operable by the trailing end of said work piece as it leaves said stationary work support to actuate said valve to open said work gripping means, and separate means operable upon the release of said work gripping means for returning said carriage to a position adjacent to the work discharge side of said stationary work support, said last mentioned means comprising a flexible cable secured to said carriage, and an electric driving unit for said cable.

9. A supporting mechanism for a moving work piece, said mechanism comprising a stationary work support, a carriage, means on said carriage for gripping the leading end of said work piece as it leaves said stationary work support, whereby said carriage moves with said work piece, a hydraulic circuit for operating said work gripping means, said hydraulic circuit including a fluid pressure cylinder operatively engaging said work gripping means to open and close the same, a reservoir for fluid, a pump for supplying said fluid to said cylinder, an electric motor for operating said pump, and a valve for controlling the flow of said fluid to said cylinder, said cylinder, reservoir, pump, electric motor and valve being all mounted on and movable with said carriage so as to constitute therewith a self-contained unit, an electric control circuit for said valve including a manually operable switch and means operated by the trailing end of said work piece as it leaves said stationary work support to actuate said switch to open said work gripping means.

10. A supporting mechanism for a moving work piece, said mechanism comprising a stationary work support, a carriage, means on said carriage for gripping the leading end of said work piece as it leaves said stationary work support, whereby said carriage moves with said work piece, a hydraulic circuit for operating said work gripping means, said hydraulic circuit including a fluid pressure cylinder operatively engaging said work gripping means to open and close the same, a reservoir for fluid, a pump for supplying said fluid to said cylinder, an electric motor for operating said pump, and a valve for controlling the flow of said fluid to said cylinder, said cylinder, reservoir, pump, electric motor and valve being all mounted on and movable with said carriage so as to constitute therewith a self-contained unit, an electric control circuit for said valve including a manually operable switch, and means operated by the trailing end of said work piece as it leaves said stationary work support to actuate said switch to open said work gripping means, said last mentioned means comprising a lever having one arm in position to be depressed by the trailing end of said work piece as it leaves said stationary work support and an arm in position to actuate said switch when said lever is engaged by said work piece.

11. A supporting mechanism for a moving work piece, said mechanism comprising a stationary work support, a carriage, means on said carriage for gripping the leading end of said work piece as it leaves said stationary work support, whereby said carriage moves with said work piece, a hydraulic circuit for operating said work gripping means, said hydraulic circuit including a fluid pressure cylinder operatively engaging said work gripping means to open and close the same, a reservoir for fluid, a pump for supplying said fluid to said cylinder, an electric motor for operating said pump, and a valve for controlling the flow of said fluid to said cylinder, said cylinder, reservoir, pump, electric motor and valve being all mounted on and movable with said carriage so as to constitute therewith a self-contained unit, an electric control circuit for said valve including a manually operable switch, and means operated by the trailing end of said work piece as it leaves said stationary work support to actuate said switch to open said work gripping means, said last mentioned means comprising a lever having one arm in position to be depressed by the trailing end of said work piece as it leaves said stationary work support and an arm in position to actuate said switch when said lever is engaged by said work piece, said work gripping means comprising a pair of work engaging jaws, a rocker arm for actuating one of said jaws, and a wedge operable by said cylinder for actuating said wedge.

12. A supporting mechanism for a moving work piece, said mechanism comprising a stationary work support, a carriage, means on said carriage for gripping the leading end of said work piece as it leaves said stationary work support, whereby said carriage moves with said work piece, a hydraulic circuit for operating said work gripping means, said hydraulic circuit including a fluid pressure cylinder operatively engaging said work gripping means to open and close the same, a reservoir for fluid, a pump for supplying said fluid to said cylinder, an electric motor for operating said pump, and a valve for controlling the flow of said fluid to said cylinder, said cylinder, reservoir, pump, electric motor and valve being all mounted on and movable with said carriage so as to constitute therewith a self-contained unit, an electric control circuit for said valve including a manually operable switch, and means operated by the trailing end of said work piece as it leaves said stationary work support to actuate said switch to open said work gripping means, said last mentioned means comprising a lever having one arm in position to be depressed by the trailing end of said work piece as it leaves said stationary work support and an arm in position to actuate said switch when said lever is engaged by said work piece, said work gripping means comprising vertically spaced work engaging jaws, a rocker arm for raising the lower jaw, and a wedge operated by said cylinder for actuating said rocker arm, said mechanism including inclined roll-off surfaces adapted to receive the leading and trailing ends, respectively, of said work piece when said lever is actuated by said trailing end piece to actuate said switch to release said leading end from said work gripping means.

13. A supporting mechanism for a moving work piece, said mechanism comprising a carriage having an inclined roll-off surface, means on said carriage for gripping the same to the work piece for movement therewith, said work gripping means comprising an upper jaw located above said roll-off surface and a lower jaw movable above said roll-off surface into engagement with the work piece to clamp the latter between said jaws and movable below said roll-off surface to deposit the work piece thereon.

WALTER SIEGERIST.